United States Patent [19]

Roger et al.

[11] Patent Number: 4,656,001
[45] Date of Patent: Apr. 7, 1987

[54] DEVICE FOR THE HOMOGENEOUS MIXING OF LIQUIDS FLOWING AT DIFFERENT TEMPERATURES

[75] Inventors: Gérard Roger, Hargeville; Jean J. Marsault, Arnoult en Yvelines, both of France

[73] Assignee: Stein Industrie Societe Anonyme, Velizy Villacoublay, France

[21] Appl. No.: 719,645

[22] Filed: Apr. 5, 1985

Related U.S. Application Data

[63] Continuation of Ser. No. 352,005, Feb. 24, 1982, abandoned.

[30] Foreign Application Priority Data

Feb. 24, 1981 [FR] France ............................... 81 03633

[51] Int. Cl.⁴ ...................... G21C 15/12; B01F 13/00
[52] U.S. Cl. .................................. 376/405; 376/292; 376/399; 137/13; 165/81; 165/154
[58] Field of Search ..................... 137/13, 888; 165/81, 165/83; 165/154, 155; 376/291, 292, 361, 377, 389, 399, 403, 404, 405

[56] References Cited

U.S. PATENT DOCUMENTS

| 2,563,002 | 8/1951 | Bissell, et al. | |
| 3,409,274 | 11/1968 | Lawton | |
| 3,488,067 | 1/1970 | Sommer | 376/291 |
| 3,601,079 | 8/1971 | Giles et al. | 137/13 |
| 3,643,733 | 2/1972 | Hall et al. | 165/81 |
| 3,698,430 | 10/1972 | Van Gasseit et al. | 376/352 |
| 3,913,663 | 10/1975 | Gates | 165/154 |
| 3,986,551 | 10/1976 | Kilpatrick | 165/154 |
| 4,116,765 | 9/1978 | Boy Marcotte et al. | 376/291 |
| 4,344,752 | 8/1982 | Gallagher, Jr. | 137/888 |
| 4,377,552 | 3/1983 | Doublet et al. | 376/405 |
| 4,431,049 | 2/1984 | Zamma et al. | 165/83 |

FOREIGN PATENT DOCUMENTS

| 306070 | 3/1966 | Austria . |
| 2337738 | 2/1975 | Fed. Rep. of Germany . |
| 2805576 | 9/1979 | Fed. Rep. of Germany . |
| 2907694 | 8/1980 | Fed. Rep. of Germany . |
| 1527195 | 5/1968 | France . |
| 2014728 | 4/1970 | France . |
| 559956 | 2/1946 | United Kingdom . |

OTHER PUBLICATIONS

V.D.I. Zeitschrift Article.

Primary Examiner—Deborah L. Kyle
Assistant Examiner—Richard Klein
Attorney, Agent, or Firm—Oblon, Fisher, Spivak, McClelland & Maier

[57] ABSTRACT

Device for the homogeneous mixing of liquids flowing at different temperatures comprising a member connected to an inlet tube and to an outlet tube of a main circuit in which circulates a hot liquid, a cylindrical inlet of the member being connected to a secondary tube of a secondary circuit in which circulates a cold liquid, a cylindrical circuit sealingly fixed to the member on the outlet side thereof and having openings on the inlet tube side, wherein (1) an envelope formed, as from the inlet tube, by a cylindrical part, a frustum-shaped part and a cylinder surrounds the cylindrical pipe providing an annular space with the latter over part thereof located on the side of the inlet tube and having the said openings; (2) the envelope forms a first annular channel with the member; (3) a connecting tube connected to the secondary tube and to the cylinder forms, with a cylindrical inlet of the member, a second annular channel linked to the first annular channel; and (4) the cylindrical pipe has a series of holes in the part not surrounded by the envelope of an outlet tube side.

Application to nuclear power stations using a liquid metal as the heat transfer fluid.

11 Claims, 2 Drawing Figures

DEVICE FOR THE HOMOGENEOUS MIXING OF LIQUIDS FLOWING AT DIFFERENT TEMPERATURES This application is a continuation of application Ser. No. 352,005, filed Feb. 24, 1982, now abandoned.

BACKGROUND OF THE INVENTION

The invention relates to a device for the homogeneous mixing of liquids flowing at different temperatures. Such liquid mixing problems are particularly encountered in nuclear power stations, which use a liquid metal as the heat transfer fluid. In this type of power station, part of the metal is removed from the main circuit and passed to a heat exchanger for cooling and then the thus cooled metal is reinjected into the main circuit. It is well known that mixing between the hot metals from the main circuit and the cooled metal is unsatisfactory and that there are temperature-based stratification zones in the main pipe.

OBJECT OF THE INVENTION

The object of the present invention is to bring about mixing without stratification of the liquids flowing at different temperatures.

BRIEF SUMMARY OF THE INVENTION

The invention therefore relates to a device for the homogeneous mixing of liquids flowing at different temperatures comprising a member connected to an inlet tube and to an outlet tube of a main circuit in which circulates a hot liquid, a cylindrical inlet of the member being connected to a secondary tube of a secondary circuit in which circulates a cold liquid. A cylindrical circuit is sealingly fixed to the member on the outlet side thereof and has openings on the inlet tube side. An envelope formed, as from the inlet tube, by a cylindrical part, a frustum-shaped part, and a cylinder surrounds the cylindrical pipe providing an annular space with the latter over part thereof located on the side of the inlet tube and having the said openings. The envelope forms a first annular channel with the member. A connecting tube connected to the secondary tube and to the cylinder forms, with a cylindrical inlet of the member, a second annular channel linked to the first annular channel. The cylindrical pipe has a series of holes in the part not surrounded by the envelope of the outlet tube side.

BRIEF DESCRIPTION OF THE DRAWINGS

The invention is described in greater detail hereinafter relative to non-limitative embodiments of a device for the homogeneous mixing of liquids and with reference to the attached drawings, wherein.

DETAILED DESCRIPTION OF THE PREFERRED EMBODIMENTS

Figure 1:
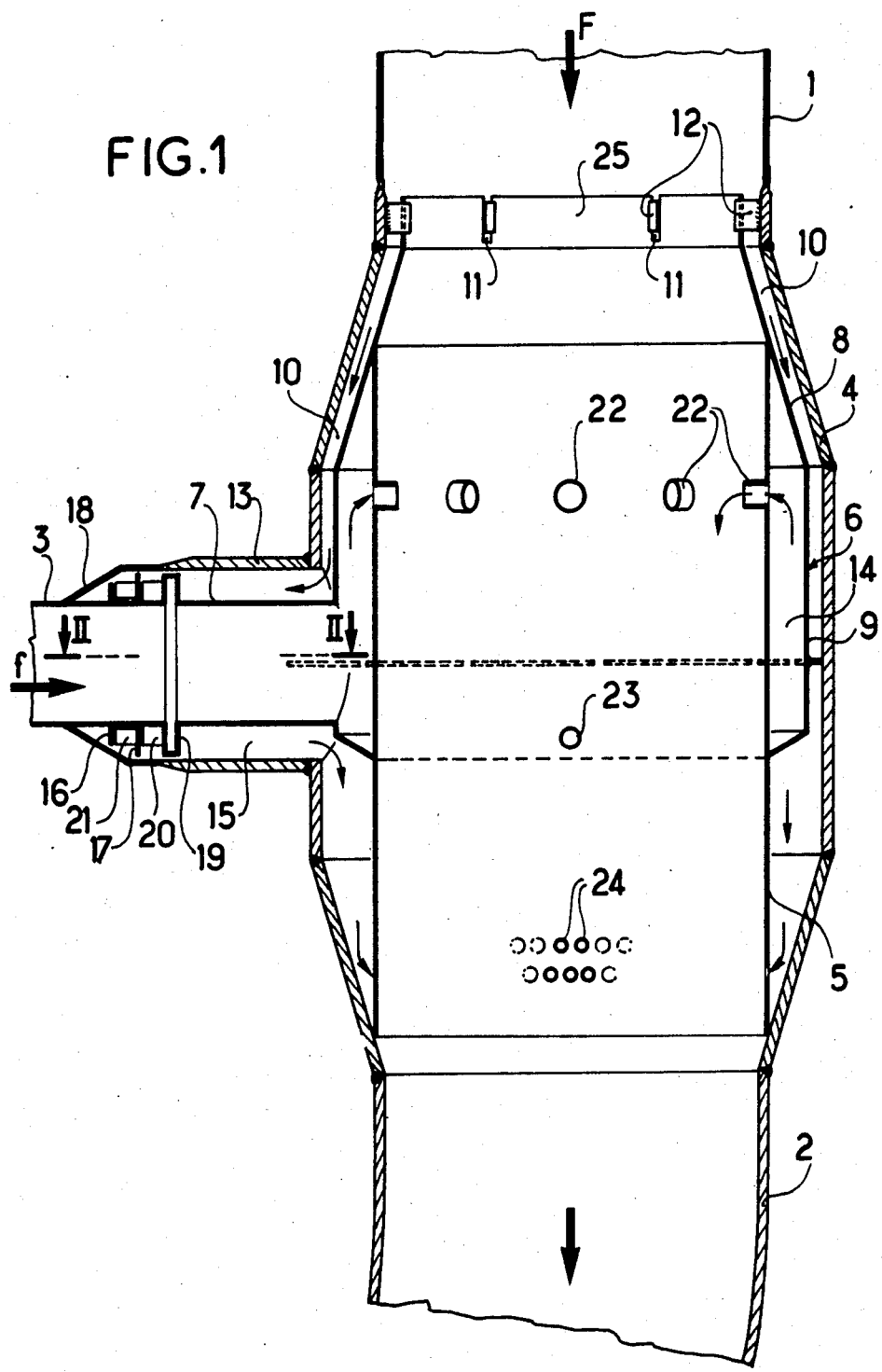
FIG. 1 shows in section and in elevation a mixing device according to the invention.

FIG. 1 shows in elevation and in section a mixing device according to the invention. Elements 1, 2 and 3 are tubes connected to a T-shaped member 4. Tubes 1 and 2 form part of a main circuit in which a hot liquid (e.g., sodium) circulates in the direction indicated by arrow F. Tube 3 forms part of a secondary circuit, and a colid liquid (e.g., sodium) circulates in the direction indicated by arrow f. The term "cold liquid" means that the liquid coming from the secondary circuit is at a temperature lower by a few degrees than that of the hot liquid, in this case melted sodium circulating in the main circuit.

Within the T-shaped member 4, a mixing device is constituted by a cylindrical pipe 5, an envelope 6, and a connecting tube 7. The downstream end of the cylindrical pipe 5 is sealingly joined to the T-shaped member 4 on the hot liquid outlet side, the diameter of the cylindrical pipe 5 being substantially the same as that of tube 2 connected to the member 4 on the hot liquid outlet side. Envelope 6 has a frustum-shaped part 8 extended by a cylinder 9. Part 8 sealingly covers the upstream end of cylindrical pipe 5, which is not fixed to the member 4 and is terminated by a cylindrical part 25 protruding into the tube 1 level with the connection of the tube 1 to the member 4.

The frustum-shaped part 8 and the cylinder 9 form between them and the member 4 a first annular channel 10 which communicates with the main circuit on the side of tube 1. The frustum-shaped part 8 is positioned in a non-rigid manner in the member 4. To this end, the cylindrical part 25 has slots 11 which engage clips 12 integral with the member 4.

Cylinder 9 surrounds the cylindrical pipe 5 facing a cylindrical inlet 13 of the member 4 connected to the tube 3. The cylinder 9 extends an axial distance in the member 4 at least equal to the diameter of the cylindrical inlet 13. Cylinder 9 is sealingly joined at its end opposite to frustum-shaped part 8 the cylindrical pipe 5 and forms between it and the cylindrical pipe 5 an annular space 14. The connecting tube 7, the diameter of which is the same as that of the tube 3 to which it is connected, is also sealingly connected to the cylinder 9. Between the connecting tube 7 and the cylindrical inlet 13 of the member, a second annular channel 15 is formed.

Figure 2:
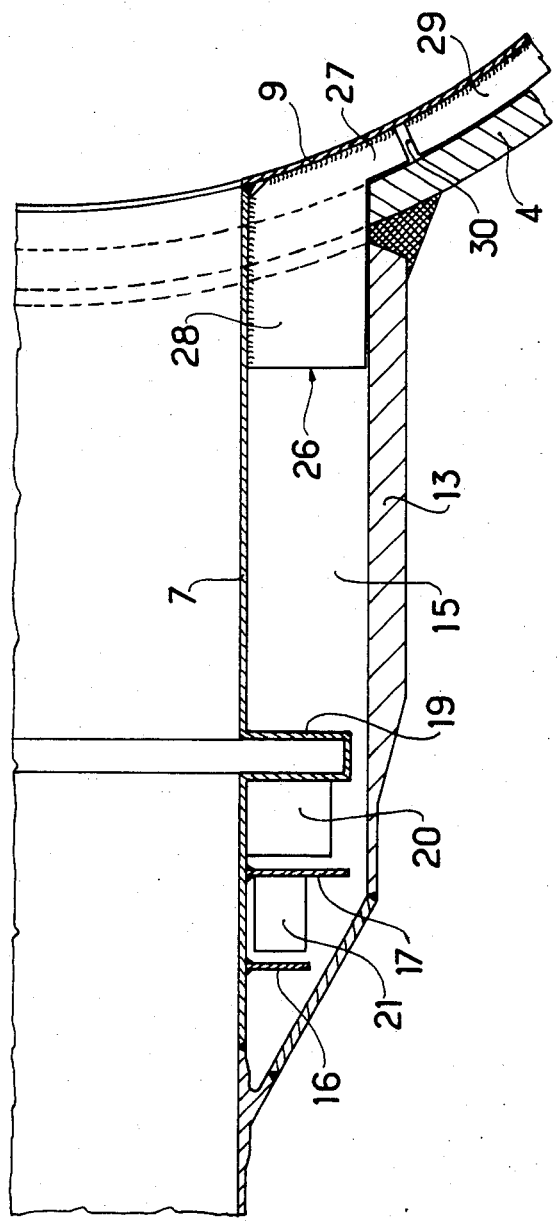
FIG. 2 shows a part section II—II of the mixing device of FIG. 1.

As best seen in FIG. 2, welded to connecting tube 7 are two rings 16, 17 which are perpendicular to connecting tube 7 and which do not come into contact with a connecting wall 18 connecting the tube 3 to the cylindrical inlet 13 of the member 4. A circular bellows 19 in the connecting tube 7 absorbs the length variations of the connecting tube 7 as a function of changes in the temperature. On the same side as ring 17, bellows 19 has fins 20 regularly disposed around connecting tube 7. In the same way, on the same side as ring 16, ring 17 has fins 21 regularly spaced around connecting tube 7. Fins 20 and 21 are in planes passing through the axis of the connecting tube 7.

Between the tube 1 and the cylindrical inlet 13 of the member 4, the cylindrical pipe 5 has a row of radially inwardly projecting tubes 22 regularly arranged around its circumference. These tubes, which are of limited length compared with the diameter of the cylindrical pipe 5, are entirely positioned within the latter.

In the lower part of the annular space 14, the cylindrical pipe 5 also has two diametrically opposite tube 23 located in a plane perpendicular to the cylindrical inlet 13 of member 4.

Finally, in its lower part, the cylindrical pipe 5 has holes 24 arranged in two Rows. The total cross-section of the holes 24 is virtually equivalent to the cross-section of the first annular channel 10 at its inlet (i.e., at cylindrical part 25).

FIG. 2 is a part sectional view in plane II—II of FIG. 1. In it one may see a deflector 26, integral with the cylinder 9 and the connecting tube 7. A part 27 of the deflector 26 extends up to the member 4, and another part 28 of the deflector 26 extends up to the cylindrical inlet 13. Part 28 extends in the direction of bellows 19 in order to partly obstruct the second annular channel 15. FIG. 2 only shows half of the cylindrical inlet 13. There is also another deflector 26 symmetrical to the illustrated deflector 26 with respect to the connecting tube 7.

A sector 29, fixed to the cylinder 9, extends up to member 4. Between the two deflectors 26, around cylinder 9, and in the first annular channel 10, there are a number of sectors 29 separated from one another and from the deflectors 26 in order to form in the first annular channel 10, passages 30 for the hot liquid circulating therein. The passages 30 preferably have a limited size, the distance between two sectors 29, or between one sector 29 and one deflector 26 being approximately 1/100 of the length of a sector 29. For example, there may be roughly ten sectors 29.

Most of the hot liquid arriving via tube 1 directly traverses cylindrical pipe 5 in the direction of tube 2. However, a small part of the hot liquid arriving via tube 1 flows into the first annular channel 10 and is reinjected into the cylindrical pipe 5 via the holes 24. On the side of the cylindrical inlet 13, the hot liquid arriving via the first annular channel 10 circulates around the connecting tube 7 in the second annular channel 15.

It should be noted that the presence of the two deflectors 26, of FIG. 2, forces the hot liquid to circulate in the direction of the bellows 19. However, the bellows 19, the rings 16, 17 and the fins 20, 21 create a static zone for the hot liquid at the end of the secondary inlet, in order to obtain a temperature gradient between the hot liquid in said static zone and the hot liquid arriving via the first annular channel 10. Thus, a rising temperature gradient is obtained along connecting tube 7 in the direction from its connection to tube 3 of the secondary circuit. Thus, the cold liquid arriving via tube 3 is reheated during its path along connecting tube 7 and before entering the annular space 14 to be reinjected into the hot liquid by the tubes 22, as well as the two tubes 23. As annular space 14 is in contact by cylinder 9 and frustum-shaped part 8 with the hot liquid circulating in the first annular channel 10 and by the cylindrical pipe 5 with the hot liquid of the main circuit, the cold liquid entering annular space 14 is heated before it is reinjected into the hot liquid.

The mixing device according to the invention makes it possible to heat the cold liquid and prevent temperature-based stratifications following the combination of the cold and hot liquids, particularly in the case of the liquid sodium used in the cooling circuits of nuclear power stations.

What is claimed is:

1. A device for the homogeneous mixing of liquids flowing at different temperatures, said device comprising:
   (a) a member having a first inlet adapted to be connected to a first inlet tube through which liquid at a first temperature enters said member, a second inlet adapted to be connected to a second inlet tube through which liquid at a second temperature enters said member, and an outlet adapted to be connected to an outlet tube through which the liquid which entered said member through said first and second inlets exits said member;
   (b) an envelope disposed in said member, the upstream end of said envelope being mounted in the first inlet of said member by means which permit relative movement between said envelope and said member in the direction of the liquid flow, said envelope being inwardly spaced from said member so as to define a first annular channel between said member and said envelope, said first annular channel being open to the flow of liquid at the upstream and downstream ends thereof;
   (c) a pipe disposed in said envelope and said member, said pipe defining a first annular space between said envelope and said pipe and a second annular space between said member downstream of said envelope and said pipe, said second annular space being in fluid communication with said first annular channel, the exterior surface of said pipe being sealingly engaged to the inner surface of said envelope downstream of the upstream end of said envelope, being sealingly engaged to the inner surface of said envelope at the downstream end of said envelope, and being sealingly engaged to the inner surface of said member adjacent the outlet of said member, said pipe being open to the flow of liquid at the upstream and downstream ends thereof;
   (d) a connecting tube sealingly connected to said envelope and to said member adjacent to the second inlet of said member, said connecting tube providing a path of fluid communication from the second inlet of said member to said first annular space, said connecting tube being inwardly spaced from said member so as to define a second annular channel between said member and said connecting tube, said second annular channel being in fluid communication with said first annular channel and with said second annular space;
   (e) a first plurality of openings in said pipe adjacent to its upstream end and upstream of the confluence of said connecting tube with said first annular space, said first plurality of openings being spaced around the periphery of said pipe and providing paths of fluid communication between said first annular space and the interior of said pipe;
   (f) a second plurality of openings in said pipe adjacent its downstream end and spaced around the periphery thereof providing paths of fluid communication between said second annular space and the interior of said pipe; and
   (g) baffle means disposed in said second annular channel to create a static zone in said second annular channel for the liquid which enters it from said first annular channel;
   (h) said member, said envelope, and said pipe being sized so that the major part of the flow of the liquid from the first inlet tube passes through said pipe and a minor part of the liquid from the first inlet tube flows through said first annular channel, into said second annular channel and said second annular space, and from said second annular space back into said pipe through said second plurality of openings in said pipe,
   whereby:
   (i) the major part of the liquid at the first temperature flows through said pipe and exits said member through the outlet of said member;

(j) the liquid at the second temperature flows through said connecting tube into said first annular space and from there flows upstream along the exterior surface of said pipe and through said first plurality of openings into the inside of said pipe; and (k) a minor part of the liquid at the first temperature flows through said first annular channel, from which some of it flows into the static zone in said second annular channel and some of it flows into said second annular space, and the liquid in said second annular space flows through said second plurality of openings into the inside of said pipe and exits said member through the outlet of said member.

2. A device as recited in claim 1 wherein said envelope has a first cylindrical portion at its upstream end, a first frustrum-shaped portion connected to said first cylindrical portion, a second cylindrical portion connected to said first frustrum-shaped portion, and a second frustrum-shaped portion connected to said second cylindrical portion, said first cylindrical portion being connected to said member, said first frustrum-shaped portion being connected to the upstream end of said pipe, said second cylindrical portion being connected to said connecting tube, and said second frustrum-shaped portion being connected to said pipe.

3. A device as recited in claim 1 wherein said pipe is cylindrical in shape.

4. A device as recited in claim 1 wherein said connecting tube contains a bellows portion to accommodate changes in the length of said connecting tube due to temperature variations.

5. A device as recited in claim 1 wherein said baffle means comprise a plurality of rings mounted on the exterior surface of said connecting tube perpendicularly thereto and a plurality of fins mounted on each of said rings perpendicularly thereto.

6. A device as recited in claim 1 and further comprising a pair of deflectors mounted on said envelope and on said connecting tube, one of said deflectors having a first part which extends into and partially obstructs said second annular channel and a second part which extends into and partially obstructs said first annular channel, and one of said deflectors having a first part which extends into and partially obstructs said second annular channel and a second part which extends into and partially obstructs said second annular space.

7. A device as recited in claim 1 and further comprising a plurality of sectors mounted on the outside of said envelope and extending into said first annular channel so as to at least partly divide it into a plurality of separate axial passageways.

8. A device as recited in claim 7 wherein:
(a) all of said sectors are identical and
(b) the space separating two consecutive sectors is at least approximately equal to 1/100 of the width of each sector.

9. A device as recited in claim 1 wherein said first plurality of openings in said pipe comprise a plurality of circumferentially spaced tubes projecting radially inwardly into said pipe.

10. A device as recited in claim 1 wherein the total cross-section of said first plurality of holes in said pipe is at least approximately equal to the cross-section of said first annular channel at its inlet.

11. A device as recited in claim 1 wherein:
(a) said liquids are liquid sodium metal and
(b) the device is adapted for use in a nuclear power plant.

* * * * *